United States Patent
Lindblad et al.

(10) Patent No.: US 10,655,823 B1
(45) Date of Patent: May 19, 2020

(54) SSL LIGHTING APPARATUS

(71) Applicant: AUTOMATED ASSEMBLY CORPORATION, Lakeville, MN (US)

(72) Inventors: Scott Lindblad, Chaska, MN (US); Aaron M. Anderson, Bloomington, MN (US)

(73) Assignee: Automated Assembly Corporation, Lakeville, MN (US)

( * ) Notice: Subject to any disclaimer, the term of this patent is extended or adjusted under 35 U.S.C. 154(b) by 0 days.

(21) Appl. No.: 16/266,546

(22) Filed: Feb. 4, 2019

(51) Int. Cl.
*F21V 19/00* (2006.01)
*F21V 8/00* (2006.01)
*F21Y 115/15* (2016.01)

(52) U.S. Cl.
CPC ........ *F21V 19/0025* (2013.01); *G02B 6/0025* (2013.01); *F21Y 2115/15* (2016.08)

(58) Field of Classification Search
CPC . F21V 19/0025; G02B 6/0025; G02B 6/0073; G02B 6/0083; F21Y 2115/10; F21Y 2105/10; G02F 1/133615; F21K 9/61
See application file for complete search history.

(56) References Cited

U.S. PATENT DOCUMENTS

| | | | |
|---|---|---|---|
| 4,447,859 A | 5/1984 | Raczynski | |
| 4,714,983 A | 12/1987 | Raczynski | |
| 5,461,547 A | 10/1995 | Ciupke et al. | |
| 5,562,971 A | 10/1996 | Tsuru et al. | |
| 5,598,382 A | 1/1997 | Wilson et al. | |
| 5,609,778 A | 3/1997 | Pulaski et al. | |
| 5,621,274 A | 4/1997 | McGuigan | |
| 5,811,930 A | 9/1998 | Krafcik et al. | |
| 5,817,243 A | 10/1998 | Shaffer | |
| 5,821,691 A | 10/1998 | Richie et al. | |
| 5,830,028 A | 11/1998 | Zovko et al. | |
| 5,842,297 A | 12/1998 | Tung | |
| 5,936,264 A | 8/1999 | Ishinaga | |
| 5,950,340 A | 9/1999 | Woo | |
| 6,371,637 B1 | 4/2002 | Atchinson et al. | |
| 6,388,780 B1 | 5/2002 | Monaghan et al. | |

(Continued)

FOREIGN PATENT DOCUMENTS

WO 2011/110175 A2 9/2011

OTHER PUBLICATIONS

Brooks et al, "Plasma Polymerization: A Versatile and Attractive Process for Conformal Coating," IPC APEX EXPO Conference Proceedings.

(Continued)

*Primary Examiner* — Peggy A Neils
(74) *Attorney, Agent, or Firm* — Crawford Maunu PLLC

(57) ABSTRACT

A lighting apparatus includes a light-diffusive panel that has opposing first and second faces bounded by one or more sides. A first conductor is disposed on the first face of the light-diffusive panel and proximate a first side of the one or more sides. A second conductor is disposed on the second face of the light-diffusive panel and proximate the first side. A first plurality of solid-state lighting (SSL) elements have light emitting portions that face a second side that is adjacent to the first side of the light-diffusive panel. The first plurality of SSL elements are electrically coupled to the first conductor and to the second conductor.

13 Claims, 6 Drawing Sheets

(56) References Cited

U.S. PATENT DOCUMENTS

| | | |
|---|---|---|
| 6,624,569 B1 | 9/2003 | Pennaz et al. |
| 6,631,558 B2 | 10/2003 | Burgess |
| 6,664,645 B2 | 12/2003 | Kawai |
| 6,697,130 B2 * | 2/2004 | Weindorf ............. G02B 6/0068 349/150 |
| 7,070,301 B2 | 7/2006 | Magarill |
| 7,108,414 B2 | 9/2006 | McCollum et al. |
| 7,165,863 B1 | 1/2007 | Thomas et al. |
| 7,210,838 B2 | 5/2007 | Sakurai |
| 7,336,895 B2 | 2/2008 | Okazaki |
| 7,355,562 B2 | 4/2008 | Schubert et al. |
| 7,537,374 B2 | 5/2009 | Schardt et al. |
| 7,559,684 B2 | 7/2009 | Okuda |
| 7,572,031 B2 | 8/2009 | Schultz et al. |
| 7,659,620 B2 | 2/2010 | Fernandez |
| 7,679,099 B2 | 3/2010 | Pang |
| 7,705,365 B2 | 4/2010 | Kurokawa et al. |
| 7,709,851 B2 | 5/2010 | Bader et al. |
| 7,717,605 B2 | 5/2010 | Shibata |
| 7,762,704 B2 | 7/2010 | Brychell |
| 7,850,358 B2 | 12/2010 | Hamada |
| 7,922,380 B2 | 4/2011 | Park |
| 7,959,343 B2 | 6/2011 | Ijzerman et al. |
| 7,973,327 B2 | 7/2011 | West |
| 7,989,838 B2 | 8/2011 | Ku |
| 7,990,512 B2 | 8/2011 | Yang |
| 8,002,436 B2 | 8/2011 | Wang et al. |
| 8,013,525 B2 | 9/2011 | Cok et al. |
| 8,029,163 B2 | 10/2011 | Chen et al. |
| 8,031,294 B2 | 10/2011 | Kim |
| 8,033,684 B2 | 10/2011 | Marshall et al. |
| 8,052,303 B2 | 11/2011 | Lo et al. |
| 8,061,882 B2 | 11/2011 | Bita et al. |
| 8,066,403 B2 | 11/2011 | Sanfilippo et al. |
| 8,083,238 B2 | 12/2011 | Borges |
| 8,235,574 B2 | 8/2012 | Hamada |
| 8,247,979 B2 | 8/2012 | Sun |
| 8,322,882 B2 | 12/2012 | Ward |
| 8,330,176 B2 | 12/2012 | Thompson et al. |
| 8,353,615 B2 | 1/2013 | Douglas et al. |
| 8,752,995 B2 | 6/2014 | Park |
| 8,864,357 B2 | 10/2014 | Kim |
| 9,128,222 B1 * | 9/2015 | Linblad ................ G02B 6/0021 |
| 9,151,454 B1 | 10/2015 | Lindblad et al. |
| 9,322,976 B2 * | 4/2016 | Sugiura ................ G02B 6/0061 |
| 9,606,285 B1 * | 3/2017 | Lindblad ............. G02B 6/0081 |
| 10,168,038 B1 | 1/2019 | Lindblad et al. |
| 10,168,463 B1 | 1/2019 | Neuman et al. |
| 10,317,614 B1 | 6/2019 | Lindblad et al. |
| 2001/0001207 A1 * | 5/2001 | Shimizu ............. C09K 11/7774 257/98 |
| 2004/0130019 A1 | 7/2004 | Chen |
| 2005/0152146 A1 | 7/2005 | Owen et al. |
| 2007/0133222 A1 * | 6/2007 | Watanabe ............. G02B 6/009 362/561 |
| 2008/0101084 A1 | 5/2008 | Hsu |
| 2009/0009997 A1 | 1/2009 | Sanfilippo et al. |
| 2012/0170317 A1 | 7/2012 | Tsai et al. |
| 2012/0287371 A1 | 11/2012 | Oura |
| 2012/0300495 A1 | 11/2012 | Kim et al. |
| 2012/0311857 A1 | 12/2012 | Kampfrath et al. |
| 2013/0044511 A1 * | 2/2013 | Motooka ............. G02B 6/0013 362/606 |
| 2013/0050167 A1 | 2/2013 | Yamanaka |
| 2013/0051067 A1 * | 2/2013 | Chen .................... G02B 6/0065 362/607 |
| 2013/0099275 A1 | 4/2013 | Pi et al. |
| 2013/0121023 A1 | 5/2013 | Kwon et al. |
| 2013/0201721 A1 | 8/2013 | Tsai et al. |
| 2017/0205565 A1 * | 7/2017 | Akagawa ............. G02B 6/0068 |

OTHER PUBLICATIONS

Quinones et al., "Silicone-Phosphor Encapsulation for High Power White LEDs," ASYMTEK, Pan Pacific Symposium Conference Proceedings, ASYMTEK (Jan. 24, 2008).

* cited by examiner

US 10,655,823 B1

SSL LIGHTING APPARATUS

FIELD OF THE INVENTION

The disclosed embodiments generally relate to a solid-state lighting (SSL) apparatus.

BACKGROUND

Solid-state lighting (SSL) apparatuses have semiconductor structures that emit light. Examples of SSL lighting elements include light-emitting diodes (LEDs), semiconductor laser diodes (LDs), organic light-emitting diodes (OLED), polymer light-emitting diodes (PLED), or quantum dots. SSL is becoming more popular due in part to the energy efficient qualities and durability of SSL. Applications for SSL may include advertising signage, decorations, or utility and general purpose lighting. In some implementations, SSL elements are placed along one or more edges of a light-transmitting panel, and the light-transmitting panel is configured to evenly distribute light emitted from the SSL elements through a surface of the panel.

With an edge-lit light-transmitting panel, light from the SSL elements is spread evenly through the panel by total internal reflection. Disruptions formed on the surface of the panel scatter incident light so that light is emitted from the surface of the panel.

SUMMARY

A disclosed lighting apparatus includes a light-diffusive panel that has opposing first and second faces bounded by one or more sides. A first conductor is disposed on the first face of the light-diffusive panel and proximate a first side of the one or more sides. A second conductor is disposed on the second face of the light-diffusive panel and proximate the first side. A first plurality of solid-state lighting (SSL) elements have light emitting portions that face a second side that is adjacent to the first side of the light-diffusive panel. The first plurality of SSL elements are electrically coupled to the first conductor and to the second conductor.

The above summary is not intended to describe each disclosed embodiment. The figures and detailed description that follow provide additional example embodiments and aspects.

BRIEF DESCRIPTION OF THE DRAWINGS

Other aspects and advantages will become apparent upon review of the Detailed Description and upon reference to the drawings in which.

DETAILED DESCRIPTION

Figure 1:
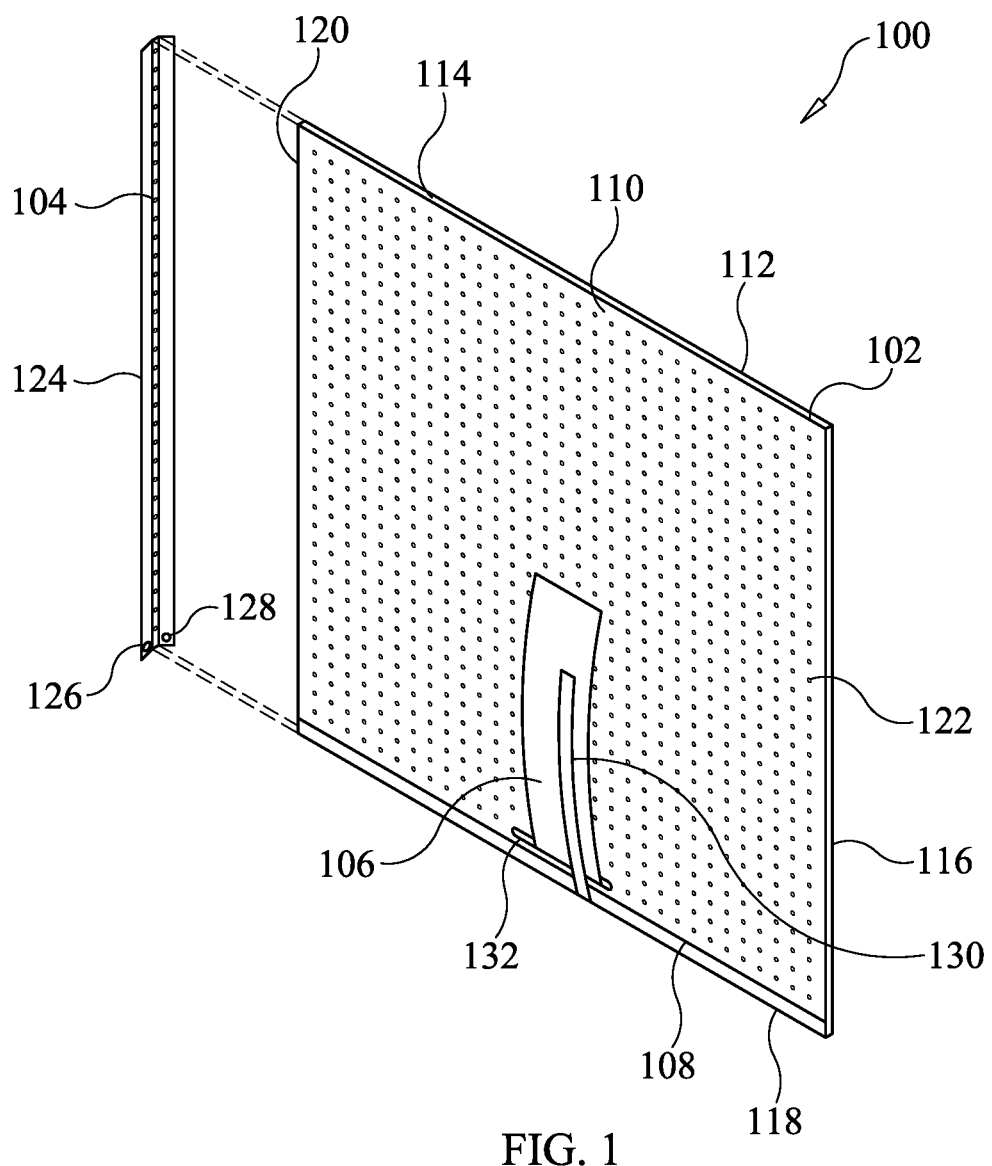
FIG. 1 shows a backside view of an exemplary lighting apparatus.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

This disclosure describes an SSL apparatus having a thin profile and economical construction. The SSL apparatus is adaptable for various applications including signage or general purpose lighting, for example. The lighting apparatus includes a light-diffusive panel, such as a sheet of acrylic. Sheets as thin as 2 mm have been found to provide effective light distribution and emission. Transparent, semi-transparent, or translucent films may also be suitable. The light-diffusive panel can have generally planar opposing surfaces, though the opposing surfaces need not be planar. The opposing surfaces can be the front-side and the backside of the panel. Light is emitted from the front-side of the panel when the lighting apparatus is powered.

Conductors for positive and negative power supply voltages are attached to the opposing surfaces of the panel proximate one of the edges of the panel. Solid-state lighting (SSL) elements are disposed adjacent to one of the sides of the panel and the light emitting portions of the SSL elements face a side of the panel that is adjacent to the side of the panel having the conductors. The SSL elements are electrically coupled to the conductors on the panel.

In one feature, a power supply lead is generally disposed on a backside of the light-diffusive panel. The power supply lead includes a flexible substrate and has conductors for positive and negative power supply voltage. An opening in the panel allows a portion of the flexible substrate and one of the conductors to pass through the panel from the front-side to the backside. Dielectric layers cover the connections between the conductors on the substrate and the conductors on the surfaces of the panel, providing reinforcement to support the electrical connection.

FIG. 1 shows a backside view of an exemplary lighting apparatus 100. The major components of the lighting apparatus include a light-diffusive panel 102, SSL elements 104, a power supply lead 106, and power distribution strips, only one (108) of which is visible in the backside view shown in FIG. 1. The light-diffusive panel 102 has opposing faces, such as a backside face 110 and a front-side face 112 that are bounded by one or more sides. In the illustrated example, the light-diffusive panel is rectangular and has four sides, with sides 114 and 116 exposed and sides 118 and 120 hidden in the view. In one implementation, the light-diffusive panel is made from a transparent thermoplastic such as polymethyl methacrylate (PMMA or "acrylic glass"). The light-diffusive panel 102 may be any polygon or a shape bounded by one or more curved sides, such as a circle, ellipse, or an irregular shape.

With an edge-lit lighting apparatus, light from the SSL elements is spread evenly through the light-diffusive panel by total internal reflection. Disruptions 122 in the surface of the panel scatter incident light so that light is emitted from the faces of the panel. The disruptions can be formed on one or both faces of the panel. The lighting apparatus can further include a reflective material (not shown) disposed on the backside face 110 so that light is emitted only from the front-side face 112.

The SSL elements 104 can be disposed on a carrier 124 such as a flexible or rigid substrate. In some implementations, the carrier can include a copper layer having flexible dielectric layers disposed on opposing surfaces of the copper layer. The carrier can be attached to the light-diffusive panel, such as by pressure sensitive adhesive (PSA), such that the SSL elements 104 face the side (or "edge") 120 and emit light into the panel.

Figure 2:
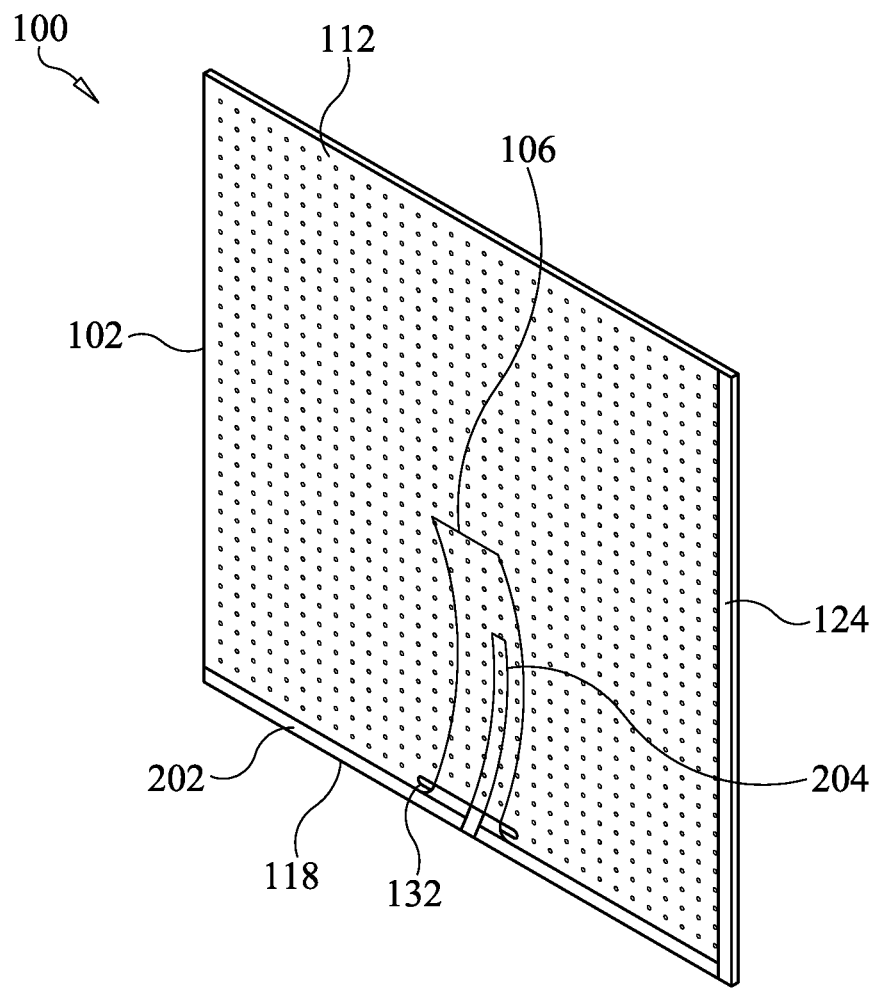
FIG. 2 shows a front-side view of the exemplary lighting apparatus of FIG. 1.

Power can be delivered to the SSL elements 104 by way of the power supply lead 106 and conductors disposed on the backside face 110 and the front-side face 112 of the light-diffusive panel 102. The conductor on the backside face is shown as conductor 108. The conductor on the front-side face is shown in FIG. 2.

The conductor 108 is disposed proximate side 118 on the backside face 110 of the light-diffusive panel. The corresponding conductor (FIG. 2, #202) on the front-side face is similarly disposed. The conductors can be constructed with metal foil or wire having a round cross-section. The conductors can be attached to the surfaces of the light-diffusive panel with a PSA, for example. Additionally, a layer of PSA can be deposited directly on desired areas of the panel, and the conductors can be placed directly on the layer of PSA.

The SSL elements 104 are electrically coupled to the conductor 108 through the copper layer of the carrier 124 and the exposed connection point 126. Exposed connection point 128 can be connected to the conductor on the front-side surface of the panel.

The power supply lead 106 can include a flexible dielectric substrate and conductors for positive and negative supply voltages. In the view of FIG. 1, the conductors are disposed on opposing surfaces of the dielectric layer. The conductors can be attached directly to the substrate by PSA, for example. The substrate of the power supply lead 106 can be attached to the light-diffusive panel 102 on the front-side face at a location adjacent to the side 118 of the panel. The conductor 130 on the power supply lead is electrically connected to the conductor 108 on the panel. The connection can be by electrically conductive adhesive, a solder joint, or a weld joint, for example. The conductor (not shown) on the other surface of the substrate is electrically connected to the conductor on the front-side surface of the panel (FIG. 2). The conductor 130 can be a metal foil and can be attached to the substrate by PSA, for example.

The opening 132 in the light-diffusive panel 102 enables convenient connections of the conductors on the power supply lead 106 to the conductors on the backside face 110 and front-side face of the panel 102. The opening extends through the panel from the backside face to the front-side face and is disposed proximate the same side 118 near which the conductor 108 is disposed. A portion of the substrate of the power supply lead 106 extends through the opening as does one of the conductors on the substrate.

The conductor 108 is shown as extending from side 116 to side 120 of the light-diffusive panel. However, it will be recognized that in implementations having a series of SSL elements 104 disposed only on one side of the panel, the conductor need only extend from the opening to the side having the SSL elements. In some implementations (not shown), multiple series of SSL elements can be attached to the light diffusive panel 102. For example, a second series of SSL elements (not shown) can be attached to side 116 of the panel and electrically connected to the conductor 108. Another implementation can include a series of SSL elements attached to side 112, side 118 or both, in which case the conductor 108 could be connected to another conductor disposed on the backside face 110 proximate side 116 or side 120. The front-side face can have a similar conductor arrangement.

FIG. 2 shows a front-side view of the exemplary lighting apparatus 100 of FIG. 1. The front-side view shows front-side face 112 of light-diffusive panel 102. The carrier 124 having SSL elements (not shown) is shown as attached to the panel. A conductor 202 is disposed on the front-side face 112 of the panel proximate side 118.

The power supply lead 106 is visible through the light-diffusive panel 102. Note that the surface of the power supply lead shown in the front-side view is the opposing surface of the power supply lead shown in the backside view of FIG. 1. A portion of the power supply lead is attached to the front-side face of the panel, and from the attached portion, another portion of the power supply lead passes through the opening 132 from the front-side face to the backside face.

The conductor 204 on the power supply lead 106 corresponds to the conductor 130 (FIG. 1), which is disposed on the opposing surface of the substrate of the power supply lead. The conductor 204 is electrically connected to the conductor 202. From the connection, a portion of conductor 204 passes through the opening 132.

Figure 3:
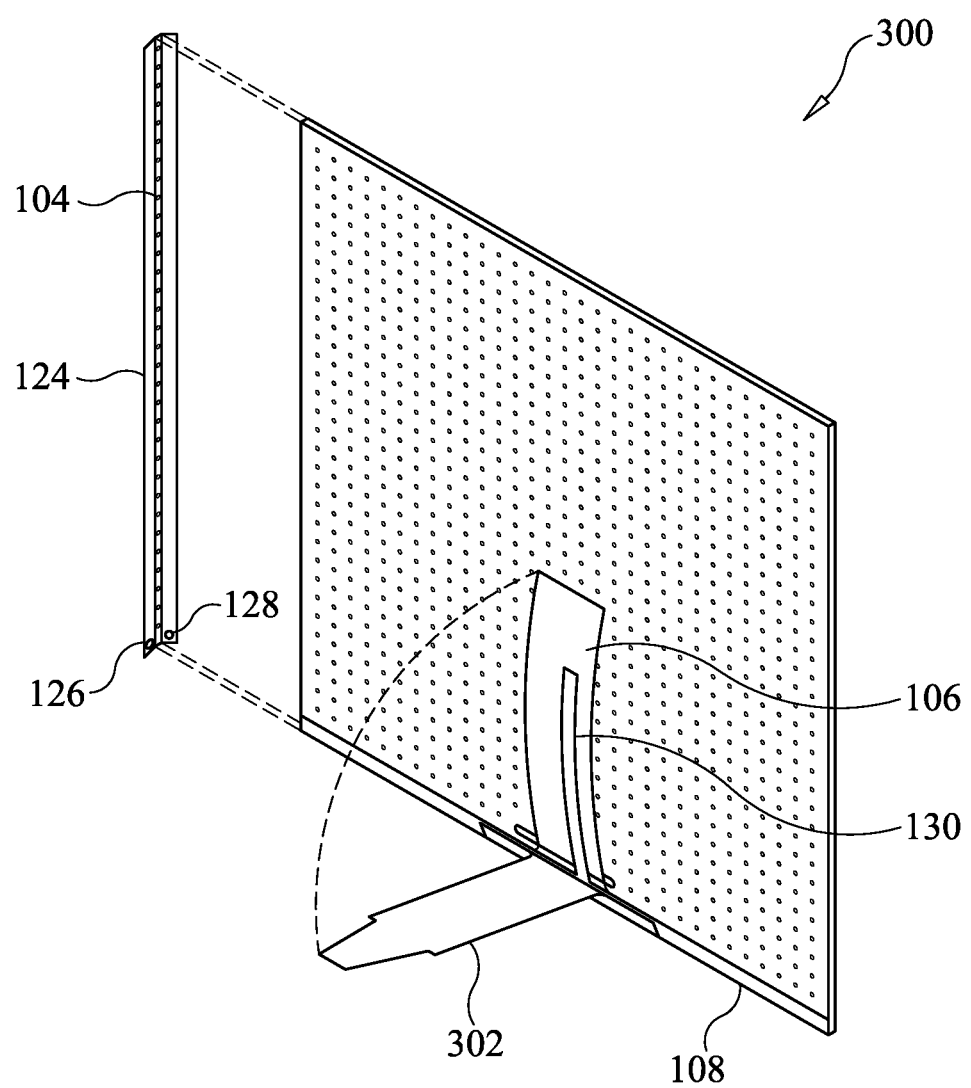
FIG. 3 shows a backside view of an exemplary lighting apparatus having a dielectric layer for covering the conductor on the substrate.

FIG. 3 shows a backside view of an exemplary lighting apparatus 300 having a dielectric layer for covering the conductor on the substrate. The lighting apparatus 300 of FIG. 3 is similar to the lighting apparatus 100 of FIG. 1, with the addition of a dielectric layer 302. The dielectric layer can be attached to the substrate of the power supply lead 106 and cover the conductor 130. A portion of the dielectric layer is attached to the back-side of the light-diffusive panel and covers the connection between the conductor on the power supply lead and the conductor 108 on the light-diffusive panel.

Figure 4:
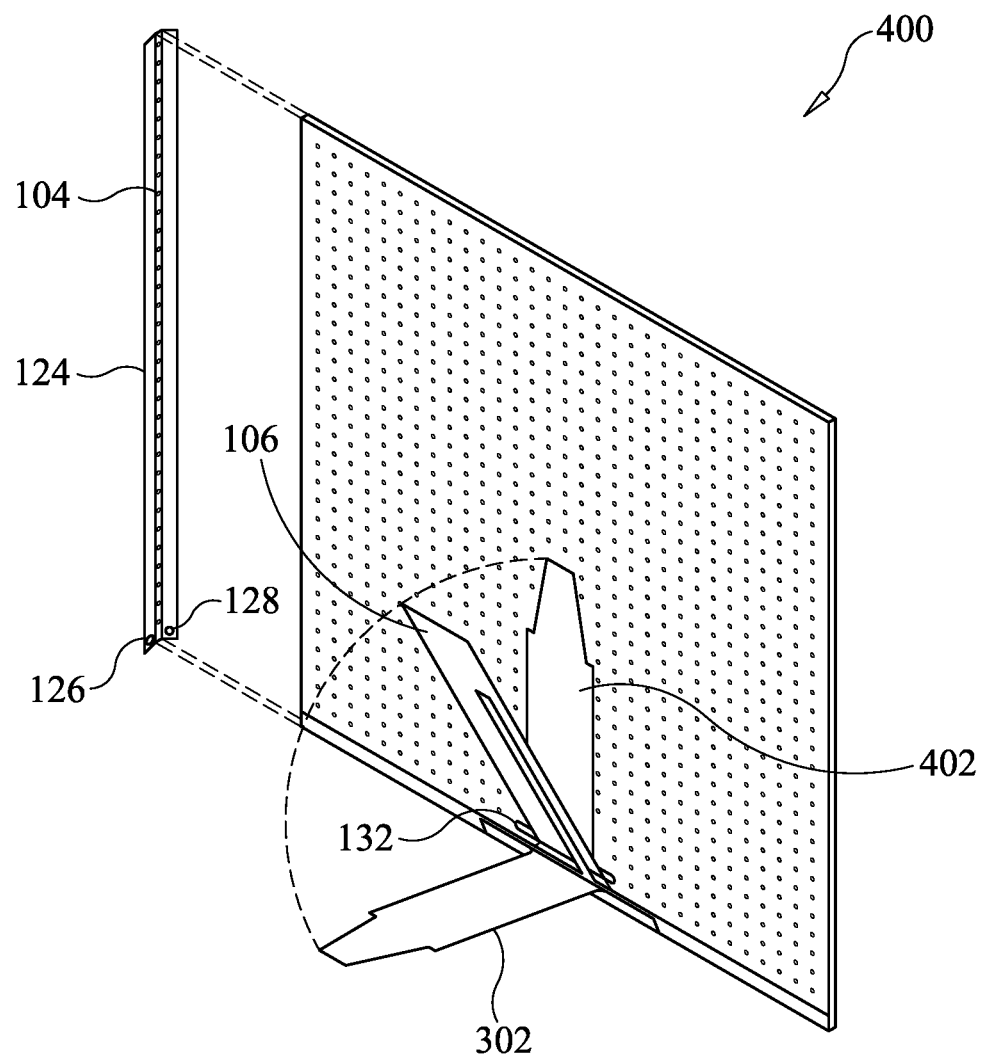
FIG. 4 shows a backside view of an exemplary lighting apparatus having two dielectric layers for covering the conductors on the opposing sides of the substrate of the power supply lead.

FIG. 4 shows a backside view of an exemplary lighting apparatus 400 having two dielectric layers for covering the conductors on the opposing sides of the substrate of the power supply lead. The lighting apparatus 400 of FIG. 4 is similar to the lighting apparatus 300 of FIG. 3, with the addition of a second dielectric layer 402.

The dielectric layer 402 has a portion (see FIG. 5) attached to the front-side face of the light-diffusive panel and a second portion, which is obscured by the substrate of the power supply lead 106, that extends through the opening 132. A third portion of the dielectric layer 402 can be attached to the substrate and cover the conductor (e.g., FIG. 2, #202) on the substrate of the power supply lead 106.

Figure 5:
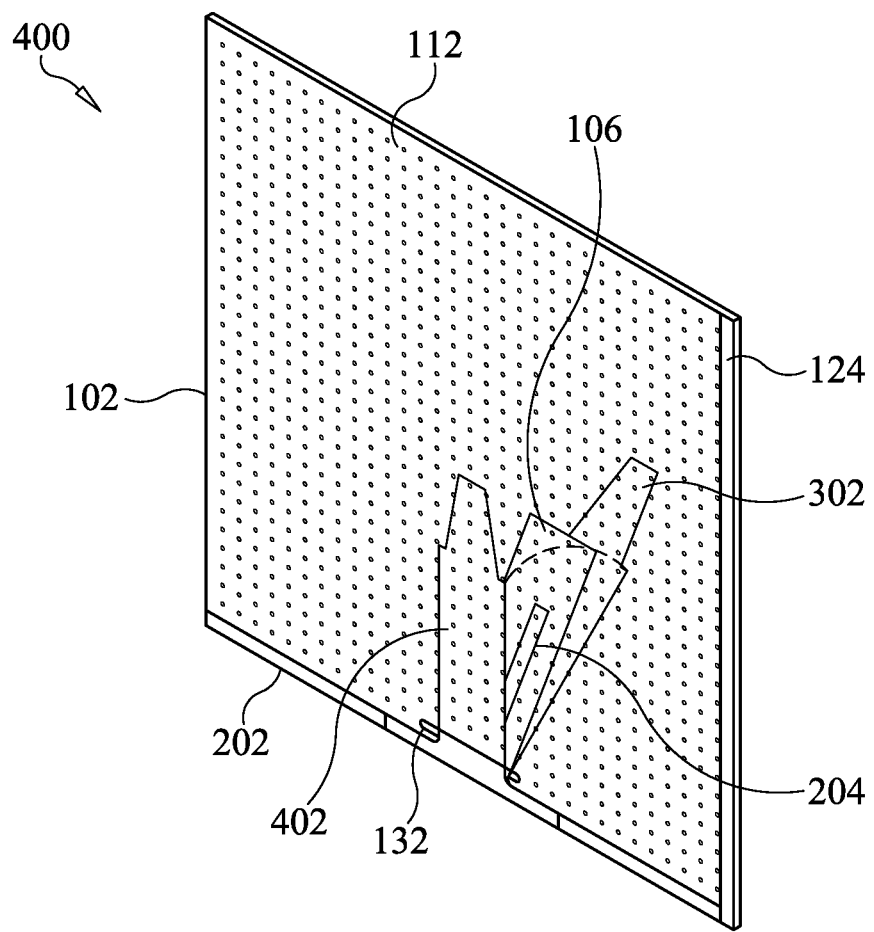
FIG. 5 shows a front-side view of the exemplary lighting apparatus of FIG. 4.

FIG. 5 shows a front-side view of the exemplary lighting apparatus 400 of FIG. 4. The carrier 124 having SSL elements (not shown) is shown as attached to the light-diffusive panel 102. The power supply lead 106, dielectric layer 302, and dielectric layer 402 are visible through the panel.

A portion of the dielectric layer 402 is attached to the front-side of the light-diffusive panel 102 and covers the connection between the conductor 202 on the panel and the conductor 204 of the power supply lead 106. From the portion of the dielectric layer 402 that is attached to the front-side of the panel, another portion of the dielectric layer extends through the opening 132 to the backside of the panel.

Figure 6:
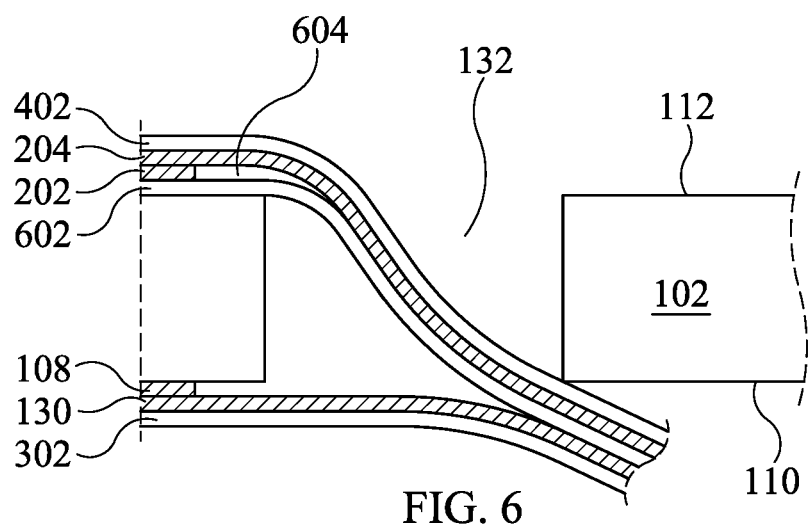
FIG. 6 shows a partial cross-sectional view of the exemplary lighting apparatus of FIG. 5.

FIG. 6 shows a partial cross-sectional view of the exemplary lighting apparatus 400 of FIG. 5. The view shows a portion of the light-diffusive panel 102, the opening 132 in the panel, the conductors 108 and 202 attached to the panel, the substrate 602 and conductors 130 and 204 of the power supply lead, and the dielectric layers 302 and 402.

The substrate 602 of the power supply lead is attached to the front-side face 112 of the light-diffusive panel 102, and a portion of the substrate passes through the opening 132 in the panel to the backside face 110. The substrate can be attached to the panel by a PSA (not shown), for example.

The conductor 202, which is attached to the front-side face as shown is FIG. 5, is disposed over the substrate 602 and can be attached thereto by a PSA (not shown). The conductor 204 is generally attached to the substrate 602, and a portion of the conductor is separated from the substrate and electrically connected to the conductor 202. Space 604 can be a void or filled with adhesive. The dielectric layer 402 can be attached to the substrate 602, such as with a PSA, and cover the conductor 204 and the connection between the conductors 202 and 204.

The conductor 108 is disposed on the backside face 110 of the light-diffusive panel 102, and the conductor can be attached to the panel by a PSA (not shown), for example. The conductor 130 of the power supply lead separates from the substrate 602 so that the conductor 130 of the power supply lead can electrically connect to the conductor 108 on the panel 102 and the substrate and other conductor 204 can pass through the opening 132. The dielectric layer 302 can be attached to the substrate 602, such as with a PSA, and cover the conductor 130 and the connection between the conductors 108 and 130.

Apart from layers of adhesive (not shown), the dielectric layer 302 is directly attached to the substrate 602, the conductors 130 and 204 are directly attached to the substrate, and the dielectric layer 402 is directly attached to the substrate. Adhesives other than PSA may be suitable according to application requirements.

Figure 7:
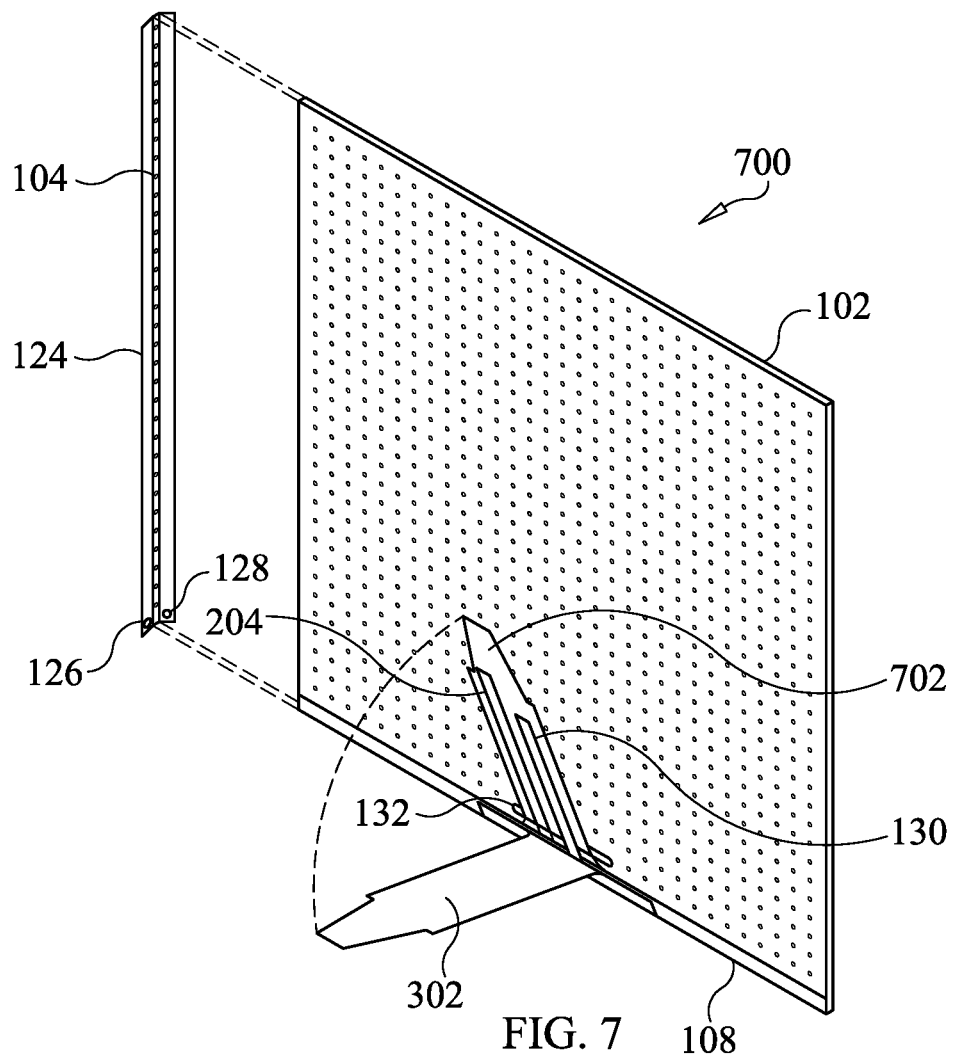
FIG. 7 shows a backside view of another exemplary lighting apparatus.

FIG. 7 shows a backside view of another exemplary lighting apparatus 700. The lighting apparatus 700 differs from the lighting apparatus 400 (FIG. 4) in that the conductors 130 and 204 are both attached on the same surface of the substrate of the power supply lead 702. As both conductors are disposed on the same surface of the substrate, only one dielectric layer 302 is employed in the structure. Apart from the conductors of the power supply lead being disposed on the same surface of the substrate of the power supply lead, the structural aspects of the lighting apparatus 400 can be similarly employed in the lighting apparatus 700.

Conductor 130 of the power supply lead 702 is electrically connected to the conductor 108, and conductor 204 of the power supply lead is electrically connected to the conductor 202 (not shown) on the front-side face of the panel 102. The dielectric layer 302 is attached to the backside of the panel and covers the connection (not shown) between the conductors 130 and 108. Portions of the substrate and conductor 204 of the power supply lead 702 pass through the opening 132, and the conductor 204 is electrically connected to the conductor 202 (not shown) on the front-side of the panel.

Figure 8:
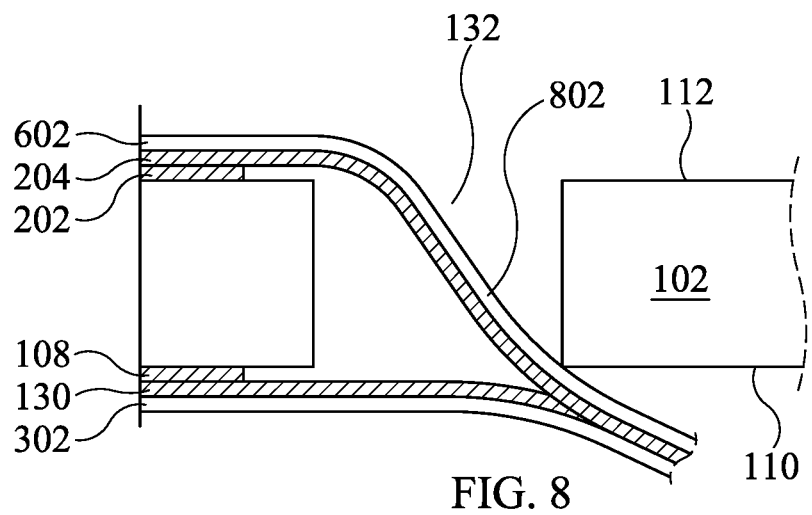
FIG. 8 shows a partial cross-sectional view of the exemplary lighting apparatus of FIG. 7.

FIG. 8 shows a partial cross-sectional view of the exemplary lighting apparatus 700 of FIG. 7. The view shows a portion of the light-diffusive panel 102, the opening 132 in the panel, the conductors 108 and 202 attached to the panel, the substrate 602 and conductors 130 and 204 of the power supply lead, and the dielectric layer 302.

The conductor 108 is attached to the backside face 110 of the light-diffusive panel 102, and the conductor 202 is attached to the front-side face 112 of the light-diffusive panel 102. The conductors can be attached to the panel by a PSA (not shown), for example.

Conductors 130 and 204 are both attached to the surface 802 of the substrate 602 by a PSA, for example. A portion of the conductor 130 is separated from the substrate 602, which allows the electrical connection between the conductors 108 and 130 and allows the substrate 602 and conductor 204 to pass through the opening 132 for making the electrical connection between the conductors 202 and 204. The substrate covers the connection between the conductors 202 and 204, and the dielectric layer covers the connection between the conductors 108 and 130. In another implementation, the layer 302 could be the substrate, and the layer 602 could be the added dielectric layer.

The substrate 602 can be attached to the portions of the conductor 202 and to portions of the front-side face 112 of the panel at areas beyond the electrical connection between conductors 202 and 204. Similarly, the dielectric layer 302 can be attached to portions of the conductor 108 and to portions of the backside face 110 of the panel at areas beyond the electrical connection between conductors 108 and 130. The attachments can be by PSA, for example.

Apart from layers of adhesive (not shown), the dielectric layer 302 is directly attached to the substrate 602, and the conductors 130 and 204 are directly attached to the substrate. Adhesives other than PSA may be suitable according to application requirements.

Though aspects and features may in some cases be described in individual figures, it will be appreciated that features from one figure can be combined with features of another figure even though the combination is not explicitly shown or explicitly described as a combination.

The present invention is thought to be applicable to a variety of lighting applications. Other aspects and embodiments will be apparent to those skilled in the art from consideration of the specification and practice disclosed herein. It is intended that the disclosed apparatus and method be considered as examples only, with a true scope of the invention being indicated by the following claims.

What is claimed is:
1. A lighting apparatus, comprising:
a light-diffusive panel having opposing first and second faces bounded by one or more sides, and having an opening that extends through the panel from the first face to the second face and is disposed proximate the one of the sides;
a first conductor disposed on the first face of the light-diffusive panel and proximate a first side of the one or more sides;
a second conductor disposed on the second face of the light-diffusive panel and proximate the first side;
a flexible substrate attached to the light-diffusive panel and adjacent to the second face of the light-diffusive panel a third conductor disposed on the substrate and electrically coupled to the first conductor a fourth conductor disposed on the substrate and electrically coupled to the second conductor wherein a portion of the substrate extends through the opening, and the third conductor extends through the opening and is directly connected to the first conductor; and a first plurality of solid-state lighting (SSL) elements having light emitting portions that face a second side that is adjacent to the first side of the light-diffusive panel, the first plurality of SSL elements electrically coupled to the first conductor and to the second conductor.

2. The lighting apparatus of claim 1, wherein:

the substrate has opposing first and second surfaces;

the third conductor is disposed on the first surface of the substrate; and the fourth conductor is disposed on the second surface of the substrate.

3. The lighting apparatus of claim 2, further comprising:

a first dielectric layer having a first portion attached to the first face of the light-diffusive panel, a second portion that extends through the opening, and a third portion that covers the third conductor on the substrate; and a second dielectric layer having a first portion attached to the second face of the light-diffusive panel and a second portion that covers the fourth conductor on the substrate.

4. The lighting apparatus of claim 1, wherein the substrate has opposing first and second surfaces, and the third conductor and the fourth conductor are disposed on the first surface of the substrate.

5. The lighting apparatus of claim 4, further comprising a dielectric layer having a first portion attached to the second face of the light-diffusive panel and a second portion that covers the third and fourth conductors on the substrate.

6. The lighting apparatus of claim 1, wherein the third and fourth conductors comprise metal foil.

7. The lighting apparatus of claim 1, wherein the first and second conductors comprise metal foil.

8. The lighting apparatus of claim 1, wherein the first and second conductors comprise wires that have round cross-sections.

9. The lighting apparatus of claim 1, wherein the first conductor and the second conductor are attached to the light-diffusive panel by a pressure-sensitive adhesive.

10. The lighting apparatus of claim 1, wherein the first plurality of SSL elements are disposed on a carrier tape, and the carrier tape is attached to the light-diffusive panel by a pressure-sensitive adhesive.

11. The lighting apparatus of claim 10, wherein the carrier tape includes a copper layer and dielectric layers on opposing surfaces of the copper layer.

12. The lighting apparatus of claim 1, further comprising a second plurality of SSL elements having light emitting portions that face a third side that is adjacent to the first side of the light-diffusive panel, the second plurality of SSL elements electrically coupled to the first conductor and to the second conductor.

13. The lighting apparatus of claim 1, further comprising:

a second plurality of SSL elements having light emitting portions that face a third side that is adjacent to the first side of the light-diffusive panel, the second plurality of SSL elements electrically coupled to the first conductor and to the second conductor;

a third plurality of SSL elements having light emitting portions that face the first side of the light-diffusive panel, the third plurality of SSL elements electrically coupled to the first conductor and to the second conductor;

a fourth plurality of SSL elements having light emitting portions that face a fourth side that is opposite the first side of the light-diffusive panel, the fourth plurality of SSL elements electrically coupled to the first conductor and to the second conductor.

* * * * *